UNITED STATES PATENT OFFICE.

RUDOLF MÜLLER, OF HÖCHST-ON-THE-MAIN, GERMANY, ASSIGNOR TO FARBWERKE VORM. MEISTER, LUCIUS & BRÜNING, OF HÖCHST-ON-THE-MAIN, GERMANY, A CORPORATION OF GERMANY.

PROCESS OF MAKING HYDROSULFITE PREPARATIONS.

No. 804,157. Specification of Letters Patent. Patented Nov. 7, 1905.

Application filed January 23, 1905. Serial No. 242,290.

*To all whom it may concern:*

Be it known that I, RUDOLF MÜLLER, Ph. D., chemist, a citizen of the Empire of Germany, residing at Höchst-on-the-Main, Germany, have invented certain new and useful Improvements in the Manufacture of Stable Hydrosulfite Preparations, of which the following is a specification.

I have found that alkali hydrosulfite may be combined with acetone, but that stable preparations may be obtained only if the hydrosulfites are brought together with ketones, such as dimethyl and ethylmethylketone, in presence of alkali and preferably simultaneously with ammonia. The solutions thus obtained may be concentrated in a vacuum at a low temperature, whereby products are obtained which are stable for a considerable time. They may be usefully employed for discharging purposes, such as the discharge of naphthylamin-bordeaux.

Example: To one liter of a solution of sodium hydrosulfite containing about thirteen per cent. of $Na_2S_2O_4$ are added one hundred and fifteen cubic centimeters of dimethylketone, fifty-four cubic centimeters of caustic-soda lye of 40° Baumé specific gravity, and fifty-two cubic centimeters of ammonia solution of thirty-five per cent. strength. A spontaneous reaction occurs with rise of temperature, and a solution is obtained which differs from the original hydrosulfite solution in that it reduces only slowly a solution of indigo-sulfonic acid in the cold, but more rapidly when it is heated.

The remarkably stable solution may be evaporated in a vacuum at a low temperature, and thus it is possible to obtain the acetone-hydrosulfite preparation in the solid state, in which it is also well stable.

Having now described my invention, what I claim is—

1. The herein-described process for the manufacture of a hydrosulfite preparation, which consists in bringing together alkali hydrosulfites with ketones, caustic alkali and ammonia and in evaporating the mixture at a low temperature in a vacuum.

2. As a new product, the hydrosulfite preparation, obtained by evaporating the solution of alkali hydrosulfite with dimethylketone, caustic alkali and ammonia, being, when dry, readily soluble in water, the solutions being alkaline and having an odor of acetone and ammonia, reducing indigo-sulfonic acid only slowly in the cold, but more rapidly when heated.

In testimony that I claim the foregoing as my invention I have signed my name in presence of two subscribing witnesses.

RUDOLF MÜLLER.

Witnesses:
    ALFRED BRISBOIS,
    JOSEPH FLACH.